(12) United States Patent
Nicholas et al.

(10) Patent No.: US 9,783,323 B2
(45) Date of Patent: Oct. 10, 2017

(54) RAM ANGLE AND MAGNETIC FIELD SENSOR (RAMS)

(71) Applicants: Andrew C. Nicholas, Glenelg, MD (US); Nelson Creamer, Waldorf, MD (US); Theodore T. Finne, Fairfax, VA (US); Federico A. Herrero, Glenn Dale, MD (US)

(72) Inventors: Andrew C. Nicholas, Glenelg, MD (US); Nelson Creamer, Waldorf, MD (US); Theodore T. Finne, Fairfax, VA (US); Federico A. Herrero, Glenn Dale, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 508 days.

(21) Appl. No.: 14/341,159

(22) Filed: Jul. 25, 2014

(65) Prior Publication Data
US 2015/0100272 A1    Apr. 9, 2015

Related U.S. Application Data

(60) Provisional application No. 61/858,349, filed on Jul. 25, 2013.

(51) Int. Cl.
*B64G 1/36* (2006.01)
(52) U.S. Cl.
CPC .............. *B64G 1/366* (2013.01); *B64G 1/36* (2013.01)
(58) Field of Classification Search
CPC ....................................................... B64G 1/366
USPC ....................................................... 702/154
See application file for complete search history.

(56) References Cited

U.S. PATENT DOCUMENTS

| 3,984,685 A * | 10/1976 | Fletcher | G01P 5/26 250/338.1 |
|---|---|---|---|
| 5,319,968 A * | 6/1994 | Billing-Ross | B64G 1/361 244/3.16 |
| 6,113,034 A * | 9/2000 | Basuthakur | B64G 1/32 244/164 |
| 2010/0013645 A1* | 1/2010 | Meier | G01W 1/00 340/601 |
| 2011/0172920 A1* | 7/2011 | Yee | G01S 7/417 702/3 |
| 2014/0246543 A1* | 9/2014 | Andoh | B64G 1/26 244/169 |

(Continued)

OTHER PUBLICATIONS

Singer et al., "Monitoring soace weather with the GOES magnetometers", 1996, SPIE, vol. 2812, p. 299-308.*

*Primary Examiner* — Ricky Ngon
(74) *Attorney, Agent, or Firm* — U.S. Naval Research Laboratory; William Ladd

(57) ABSTRACT

A method and system is described for determining attitude for a satellite. A two-axis ram sensor head measures neutral winds and provides a density of the neutral winds. A three-axis magnetometer measures a geomagnetic field. A measurement interface module calculates attitude information, which includes three-axis attitude knowledge of a satellite relative to a local-vertical local-horizontal orbit frame, based on the combined ram measurements and magnetic field measurements, and provides the attitude information to a satellite that comprises the attitude sensor system.

18 Claims, 13 Drawing Sheets

(56) References Cited

U.S. PATENT DOCUMENTS

2015/0253430 A1\* 9/2015 Beyon .................... G01S 17/95
356/28.5

\* cited by examiner

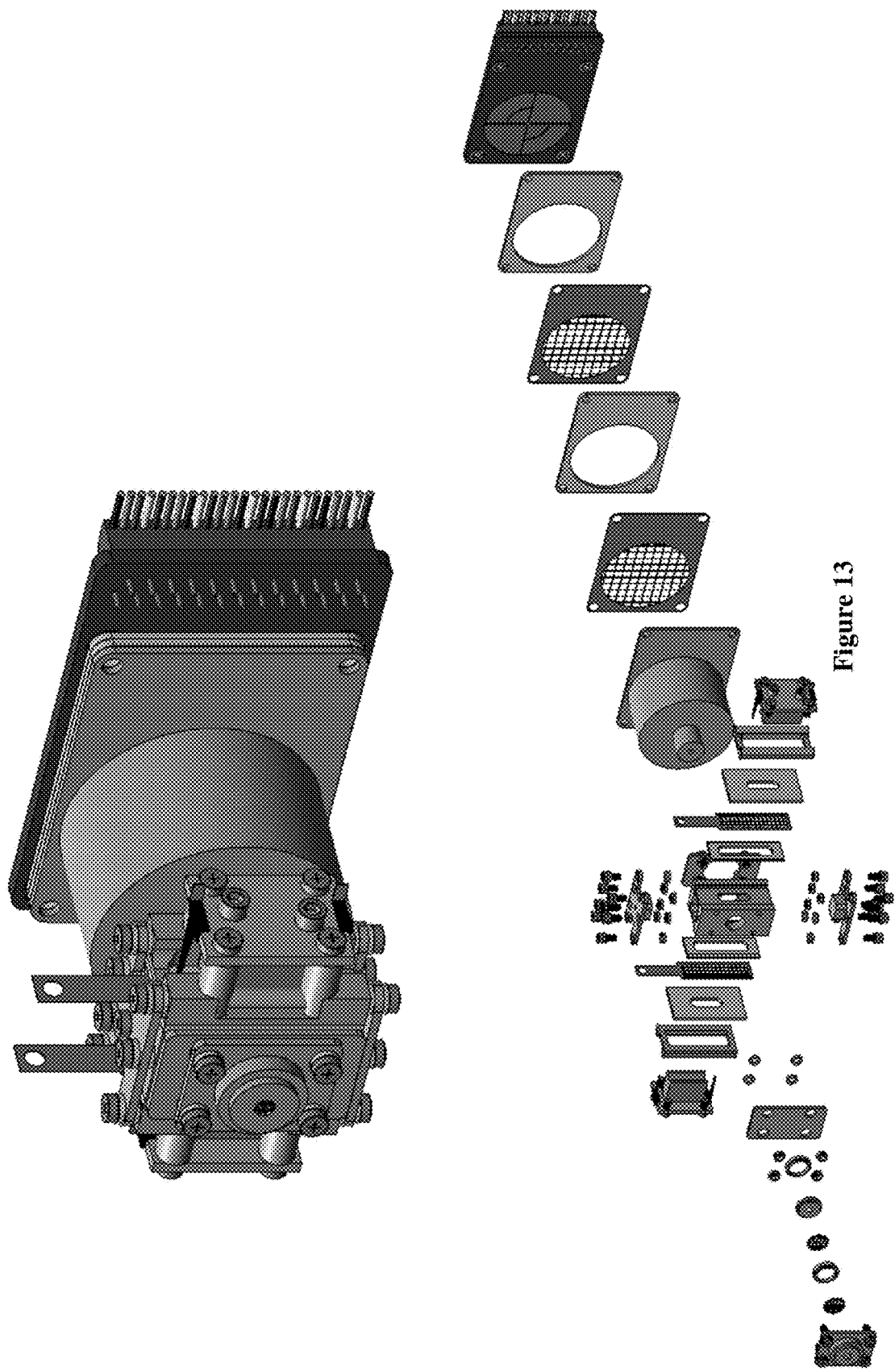

RAM ANGLE AND MAGNETIC FIELD SENSOR (RAMS)

CROSS-REFERENCE TO RELATED APPLICATIONS

This application claims priority to provisional patent application entitled, "Ram Angle and Magnetic Field Sensor," filed on Jul. 25, 2013, and assigned U.S. Application No. 61/858,349; the entire contents of which are hereby incorporated by reference.

FIELD OF THE INVENTION

The present disclosure relates generally to an attitude sensor, and more particularly, to a Ram Angle and Magnetic field Sensor (RAMS) for picosat-class missions.

BACKGROUND

The popularity of very small satellites with masses around 10 kg or less, known as picosats, has grown in recent years with the introduction of the cubesat standardization. Individual cubesats have a size of 10 cm on each side (1U), and double (2U) and triple stack (3U) versions are also utilized. Due to their low cost and simplicity, previous cubesat missions have typically been university-based projects. However, there has been some significant interest recently from government agencies to further develop and enhance the cubesat buses (as well as slightly larger nanosat buses), and to assess the value of miniature payloads hosted by these very small satellite buses.

The majority of cubesats launched to date either tumble arbitrarily with no on-board attitude control, or utilize simple magnetic control to align the bus with the geomagnetic field lines. However, recently, there have been significant advancements in the development of miniaturized space weather and radio frequency payloads for cubesat applications, though most of these payloads require pointing knowledge and control of a few degrees or better. Cubesat-compatible attitude control units with miniature reaction wheels are available for such missions, but accurate and cost-efficient three-axis attitude knowledge is still very challenging for these small satellites. Some cubesat buses manage to avoid this problem by flying in an aerodynamically-favorable orientation, exploiting deployed arrays for passive aerodynamic control augmented with active momentum bias and magnetic damping control. Future cubesat buses can utilize miniature star trackers for very precise attitude knowledge (arc-seconds). However, star trackers tend to be very costly (>$100,000) and require greater size, weight, and power than less-accurate solutions. Furthermore, many cubesat missions simply do not need the high accuracy provided by expensive star trackers. Currently the most common three-axis attitude solution for picosat-class satellites is the combination of multiple sun sensors and a magnetometer, with the obvious loss of sun information whenever the satellite passes into eclipse, which can occur for as often as one-third of every orbit.

Accordingly, there remains a need for a small cost-effective attitude sensor for picosat-class missions that can provide continuous sub-degree three-axis attitude sensing in day or night operations.

SUMMARY OF THE INVENTION

According to one aspect of the invention, a system is described for an attitude sensor system that includes a ram sensor configured to measure neutral winds; a magnetometer configured to measure a geomagnetic field; and a measurement interface module configured to combine the measurements from the ram sensor and magnetometer to calculate attitude information.

According to another aspect of the invention, a method is described for measuring neutral winds with a ram sensor; measuring a geomagnetic field with a magnetometer; and calculating attitude information with a measurement interface module based on the combined ram measurements and magnetic field measurements, wherein the measurement interface module is implemented in a computer system that comprises instructions stored in a machine-readable medium and a processor that executes the instructions.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 13 provides an alternative view of a RAMS instrument and components in accordance with an exemplary embodiment of the invention.

DETAILED DESCRIPTION OF EXEMPLARY EMBODIMENTS

Figure 1:
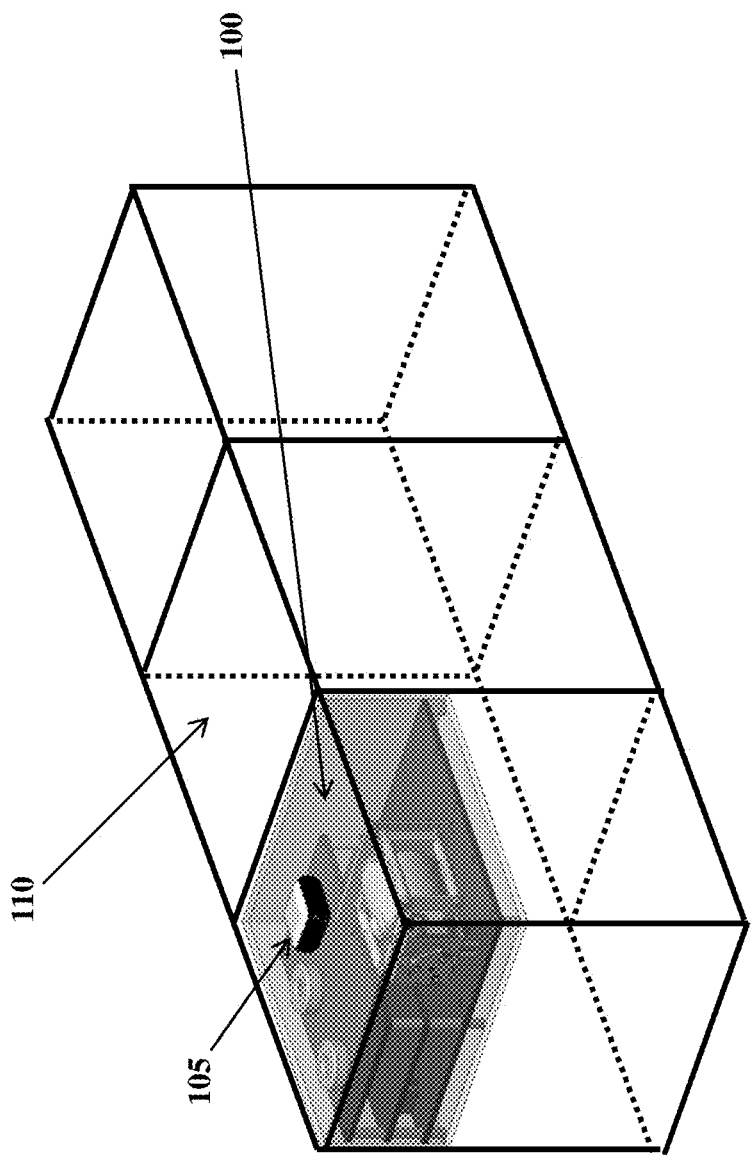
FIG. 1 is an integrated Ram Angle and Magnetic field sensor (RAMS) in accordance with an exemplary embodiment of the invention.

One or more embodiments or implementations are hereinafter described in conjunction with the drawings, where like reference numerals refer to like elements throughout, and where the various features are not necessarily drawn to scale.

Previously, a cubesat-compatible space science spectrometer capable of measuring thermospheric wind magnitude, direction, and temperature was developed, and was known as a Small Wind and Temperature Spectrometer (SWATS) instrument. The instrument was noted for its extremely small size, and it incorporated a thermionic cathode element for emitting electrons that ionize the neutral molecules of the thermospheric airstream flowing across a small aperture, and a detector element that collected the charged ions and measures the flux to determine the magnitude and direction of flow.

While the SWATS instrument was developed as an in-situ space weather sensor, the fundamental measurement of local wind direction can offer the opportunity to exploit this miniature technology for attitude sensing of the host platform. Specifically, modifying and tailoring the SWATS instrument for bus attitude determination can lead to gains in additional size, weight, and power reductions. Furthermore, by incorporating two orthogonal modified SWATS instruments, it can be possible to measure both the pitch and yaw angles of the satellite bus relative to the true ram direction, representing a vector combination of the satellite velocity direction and the local wind direction. While this two-axis attitude knowledge may suffice for some applications, to obtain three-axis attitude knowledge an additional vector measurement is required. Hence, the modified SWATS sensor can be augmented with a miniature magnetometer similar to those that have flown on previous cubesat missions.

FIG. 1 is an integrated Ram Angle and Magnetic field sensor (RAMS) 100 in accordance with an exemplary embodiment of the invention. FIG. 1 depicts the RAMS 100 and highlights the entrance aperture with a top-mounted magnetometer 105, such as a three-axis magnetometer, attached to the leading edge of a triple cubesat bus 110 (e.g., the 3U triple cubesat bus in FIG. 1). The RAMS 100 can offer continuous measurement of both the ram direction and the geomagnetic field direction, providing instantaneous three-axis attitude estimation of a satellite as long as the two directions are not parallel. As a by-product valuable for advancing knowledge in space weather and thermospheric modeling, the RAMS 100 also provides a continuous in-situ estimate of the local horizontal wind direction and density of the thermospheric neutrals.

Figure 2:
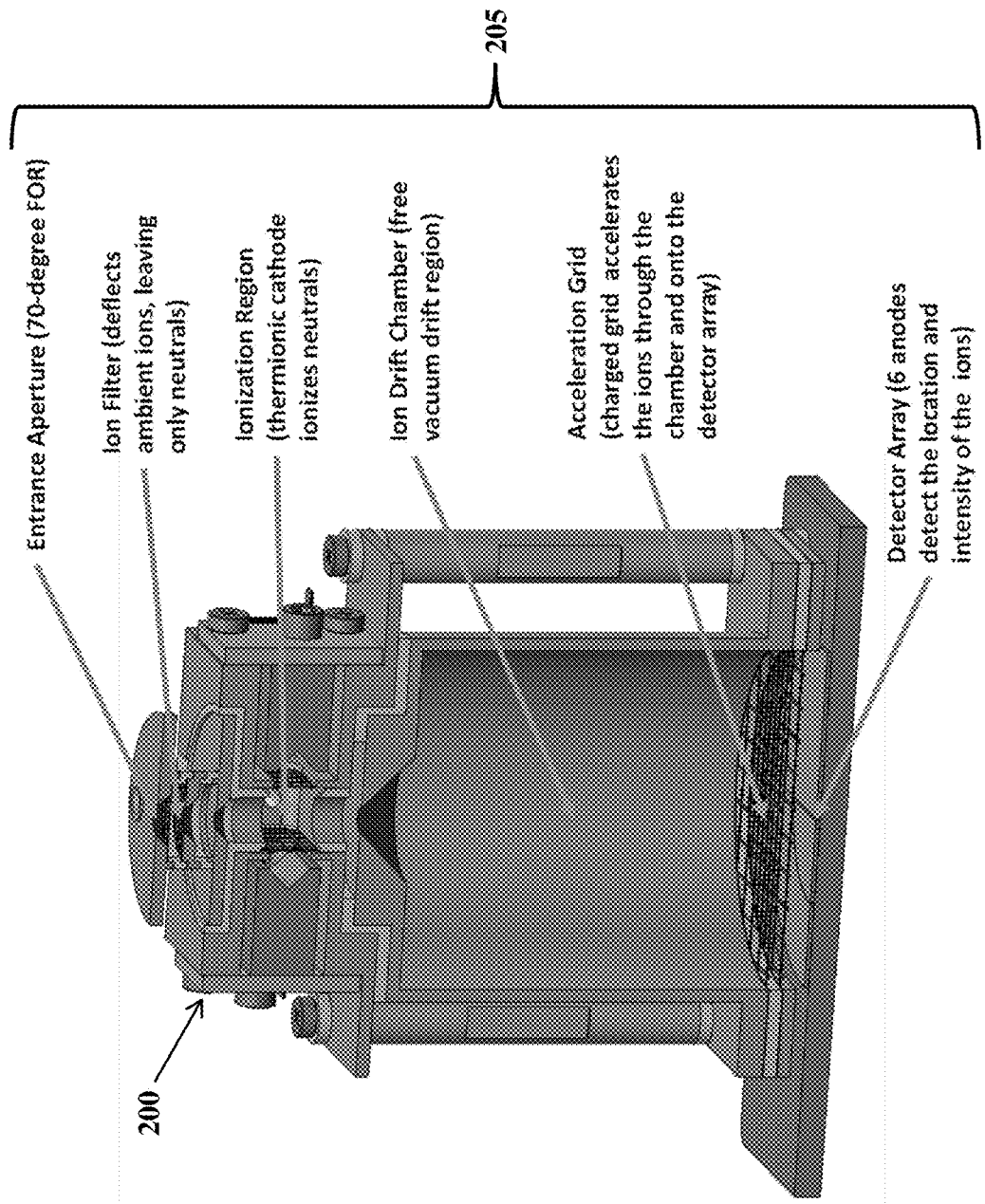
FIG. 2 is a Ram Angle and Magnetic field Sensor (RAMS) Head, in accordance with an exemplary embodiment of the invention.

FIG. 2 is a Ram Angle and Magnetic field Sensor (RAMS) 200, or two-axis ram sensor head, in accordance with an exemplary embodiment of the invention. FIG. 2 does not depict the magnetometer 105 and other support electronics, which are represented in later figures. FIG. 2 also includes a component listing and depiction of the RAMS Sensor head components 205. However, not pictured in the Figure, the ram sensor can include a ram sensor electronics module configured to power and operate the ram sensor.

As a satellite, which contains the RAMS, travels through its orbit, molecules from the thermosphere (primarily neutral atomic oxygen in Low Earth Orbit (LEO), nitrogen, helium, and hydrogen) enter the ram sensor head 200 through the aperture and pass through a charged ion filter, which deflects any existing ions out of the flow field, leaving only the neutrals. The neutrals are then ionized in a thermionic cathode chamber before passing into a free drift vacuum chamber, wherein they are accelerated through a charged grid and onto a focal plane array consisting of six anodes. The detector registers the location and intensity of the flow field for two-axis angle and density determination. As a by-product, the sensor also can provide an estimate of the horizontal crosswind angle and density of the neutrals.

Figure 3:
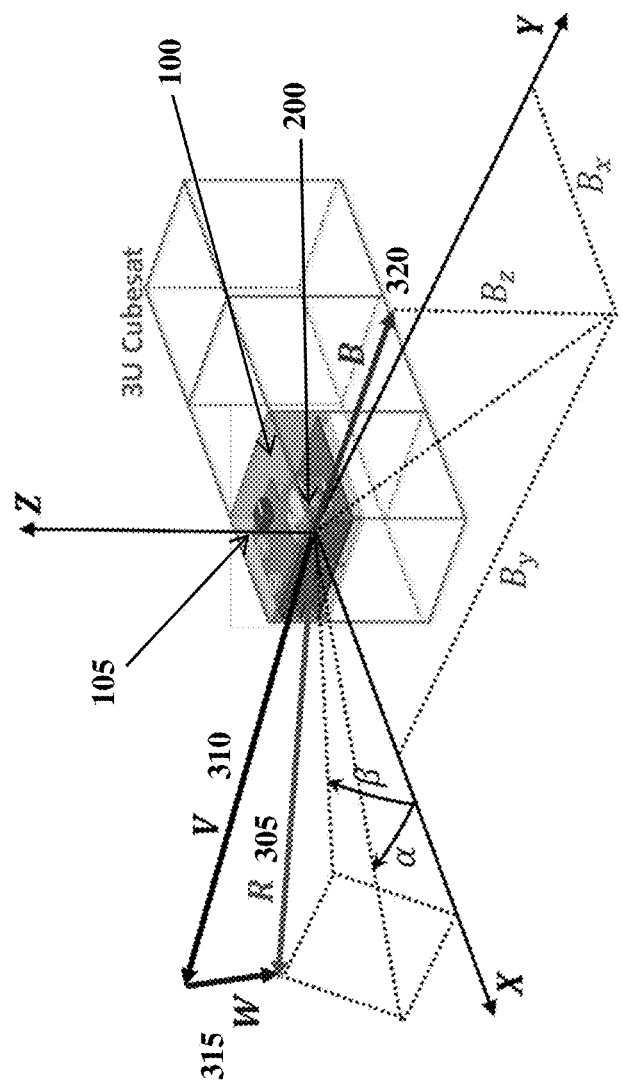
FIG. 3 depicts a RAMS instrument implemented in a CubeSat to determine attitude, in accordance with an exemplary embodiment of the invention.
Figure 4:
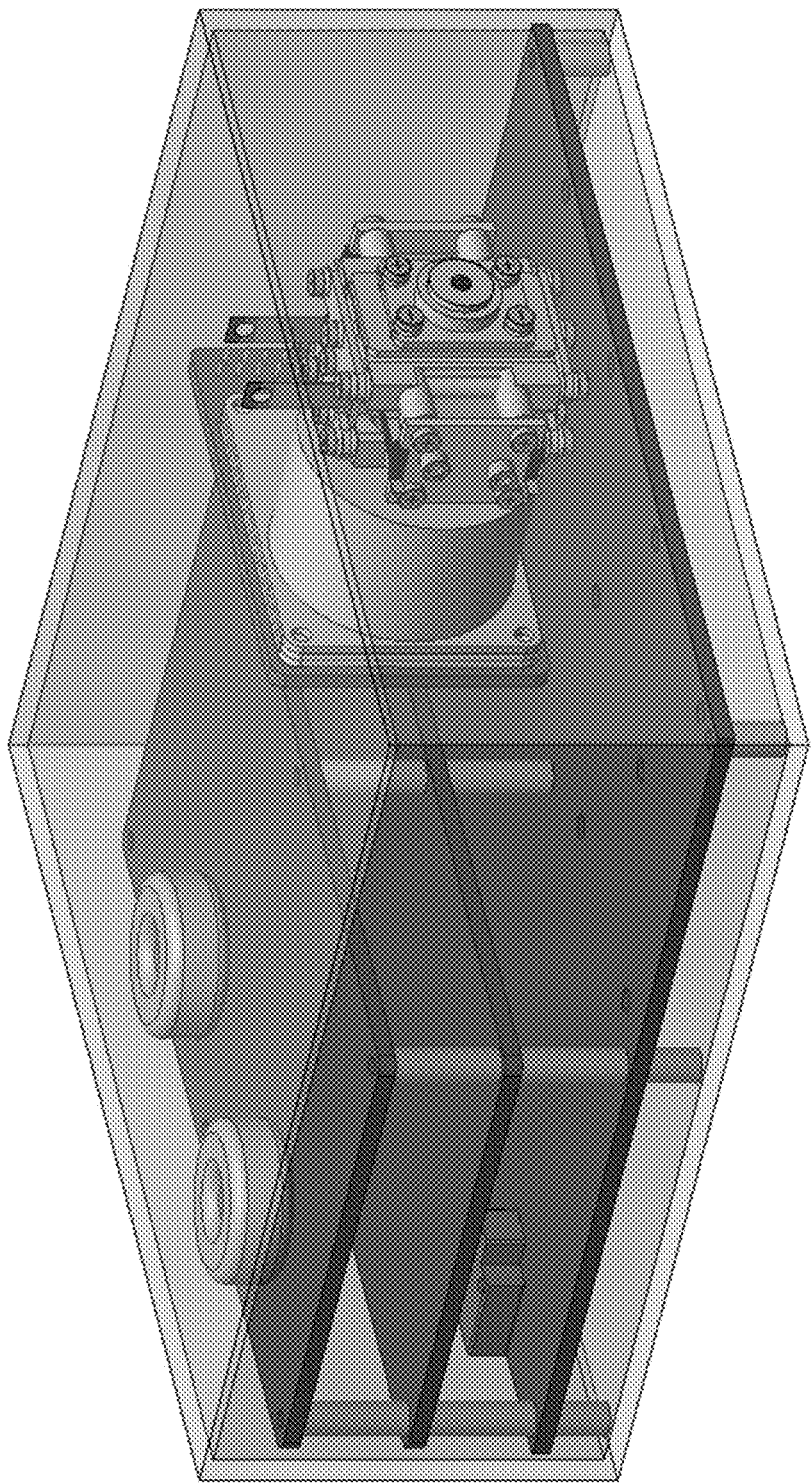
FIG. 4 provides an alternative view of a RAMS instrument and components in accordance with an exemplary embodiment of the invention.
Figure 5:
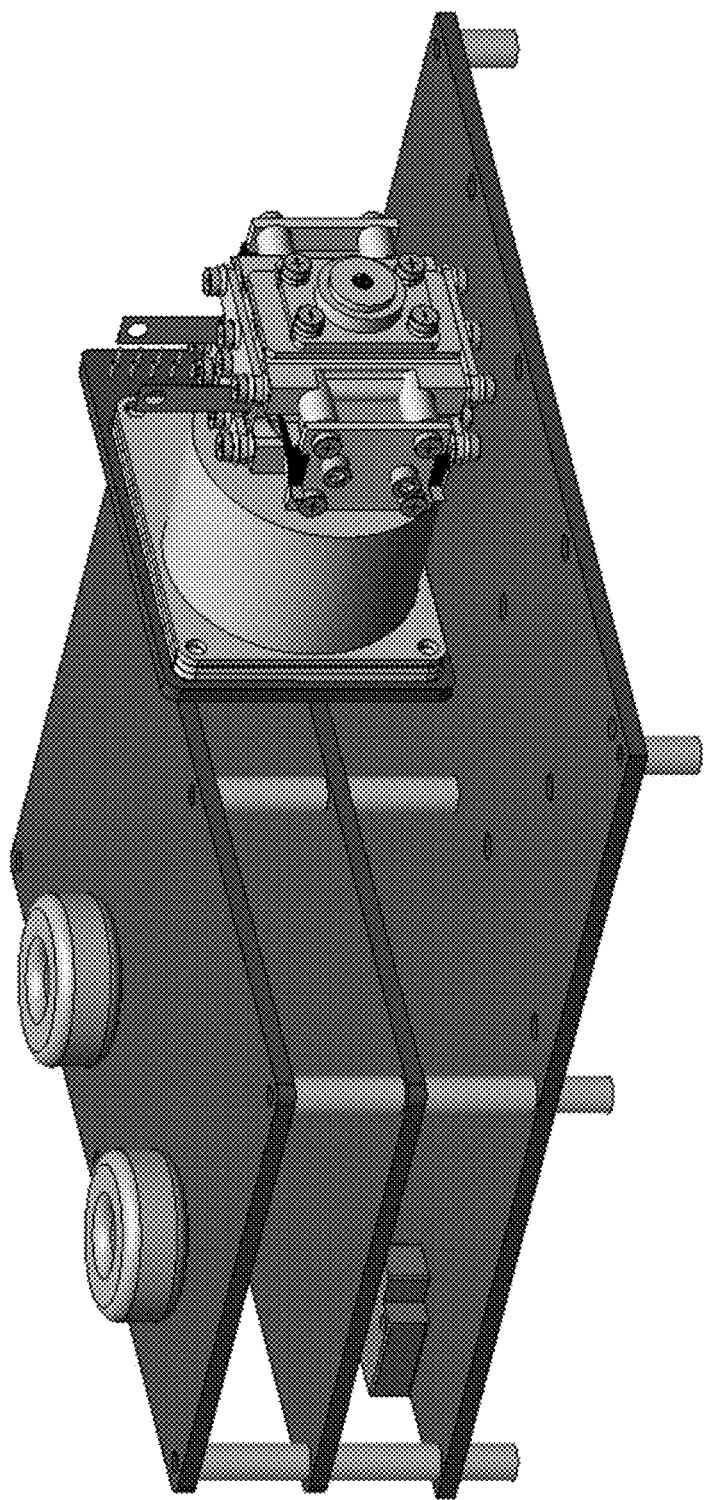
FIG. 5 provides an alternative view of a RAMS instrument and components in accordance with an exemplary embodiment of the invention.
Figure 6:
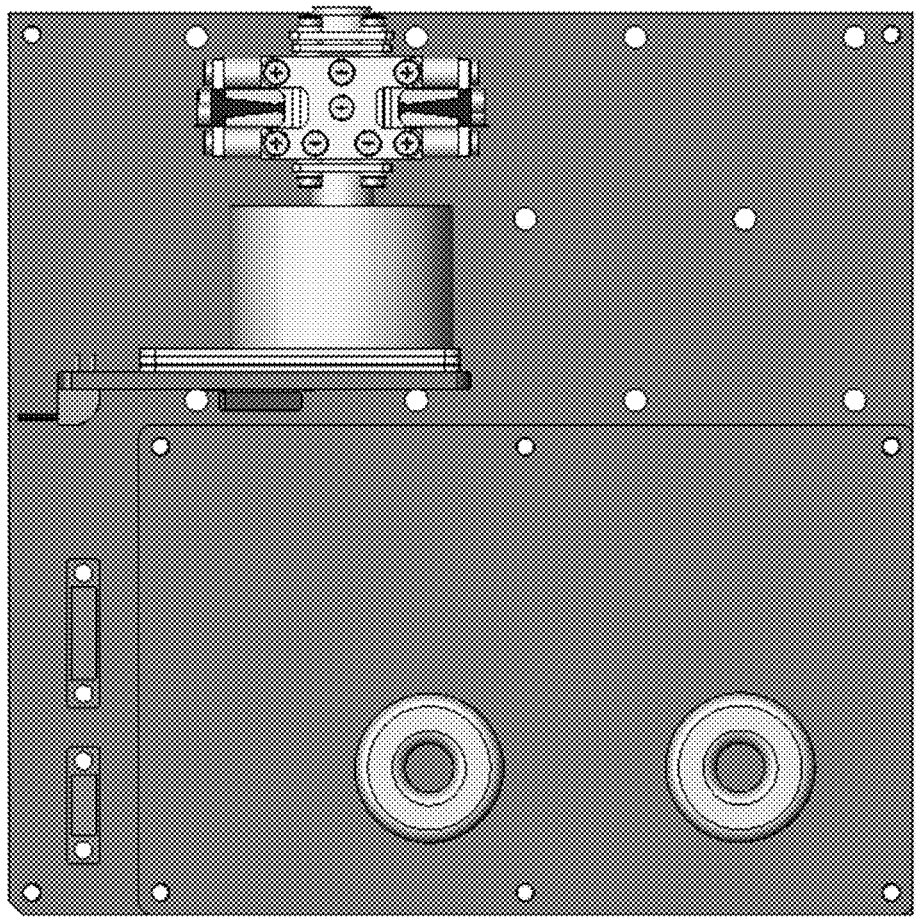
FIG. 6 provides an alternative view of a RAMS instrument and components in accordance with an exemplary embodiment of the invention.
Figure 7:
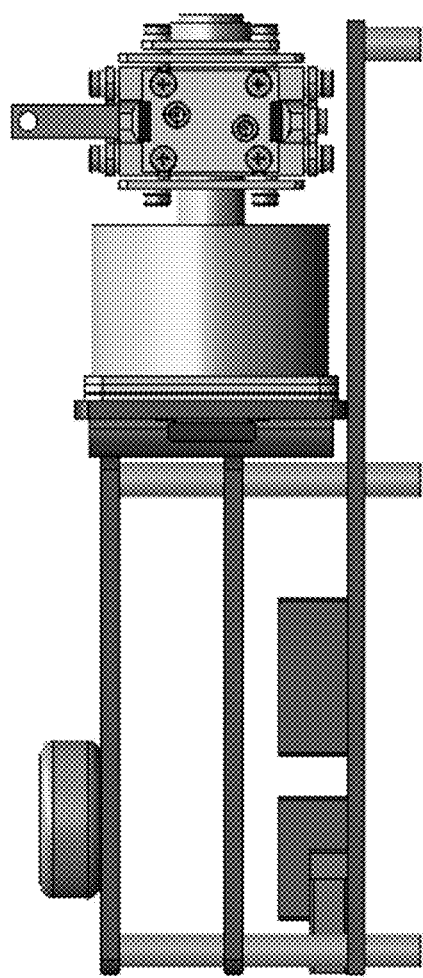
FIG. 7 provides an alternative view of a RAMS instrument and components in accordance with an exemplary embodiment of the invention.
Figure 8:
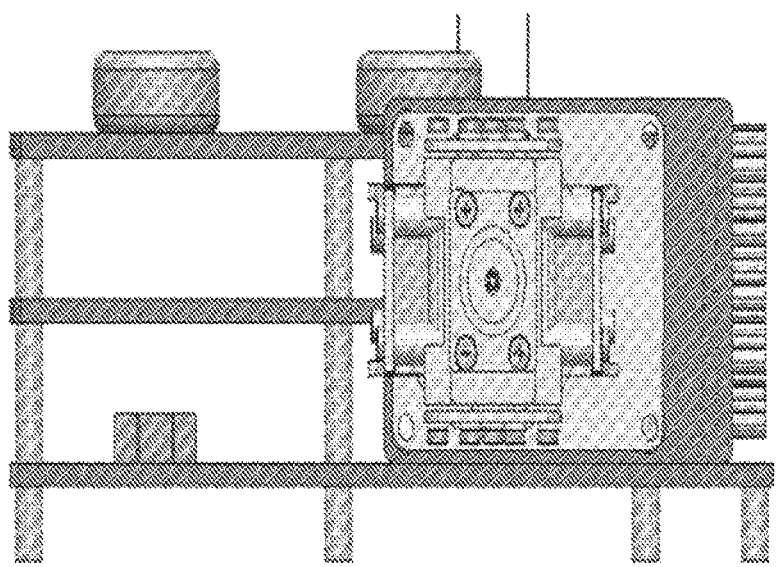
FIG. 8 provides an alternative view of a RAMS instrument and components in accordance with an exemplary embodiment of the invention.
Figure 9:
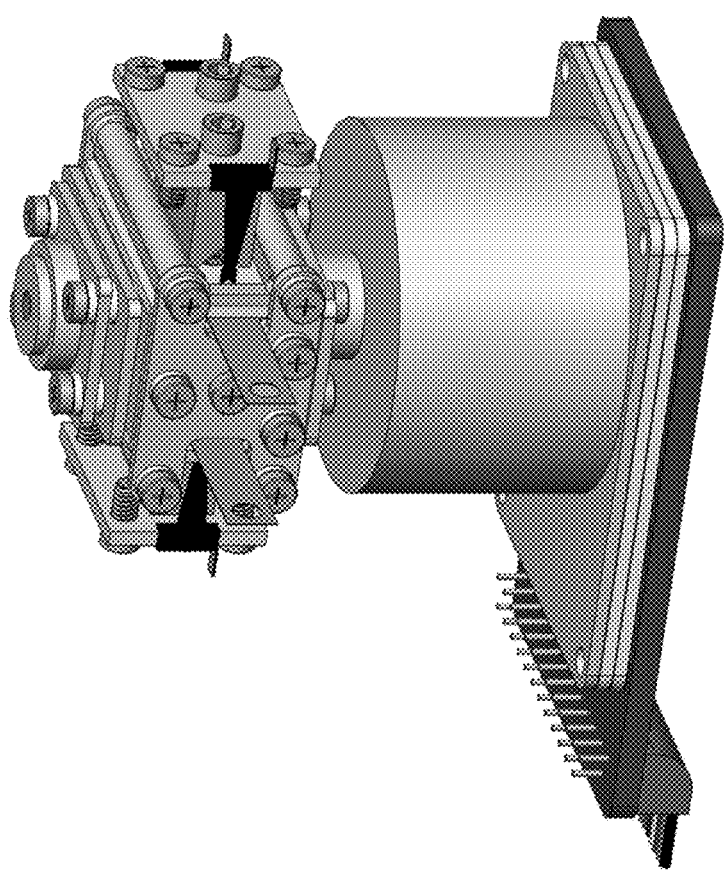
FIG. 9 provides an alternative view of a RAMS instrument and components in accordance with an exemplary embodiment of the invention.
Figure 10:
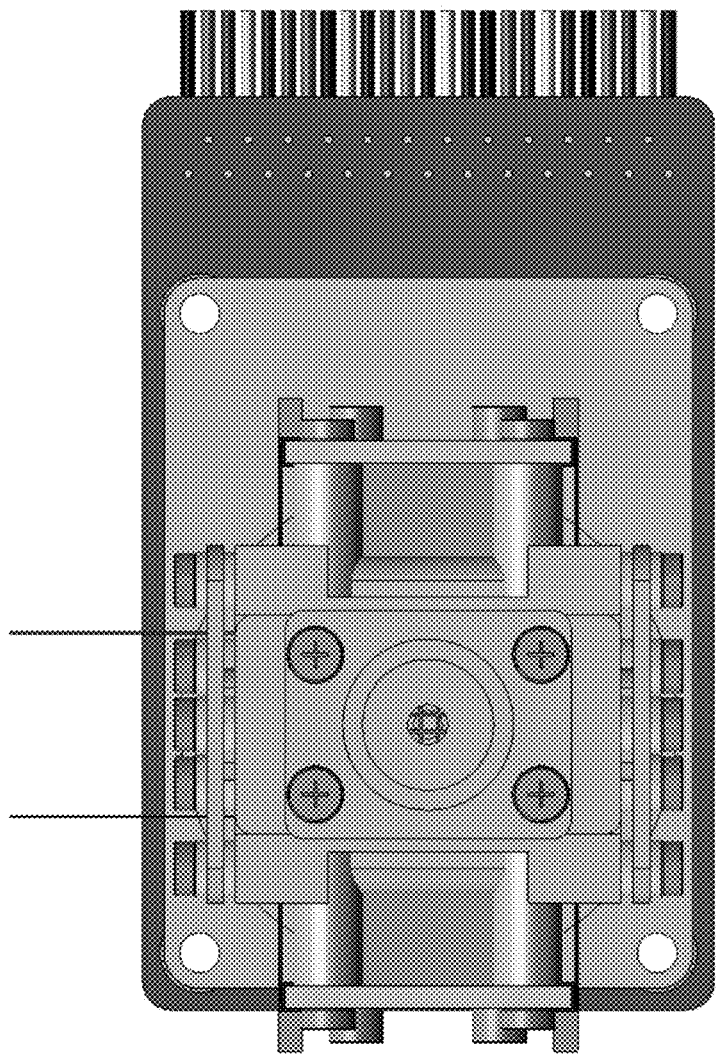
FIG. 10 provides an alternative view of a RAMS instrument and components in accordance with an exemplary embodiment of the invention.
Figure 11:
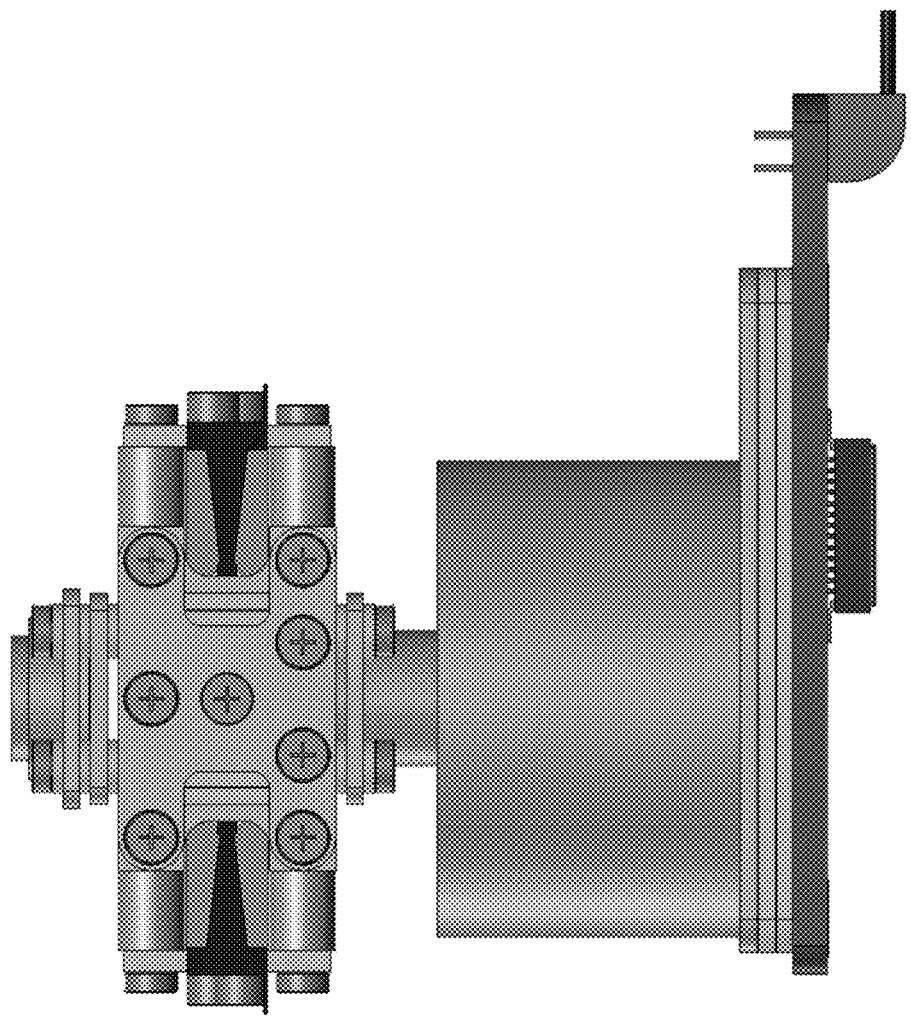
FIG. 11 provides an alternative view of a RAMS instrument and components in accordance with an exemplary embodiment of the invention.
Figure 12:
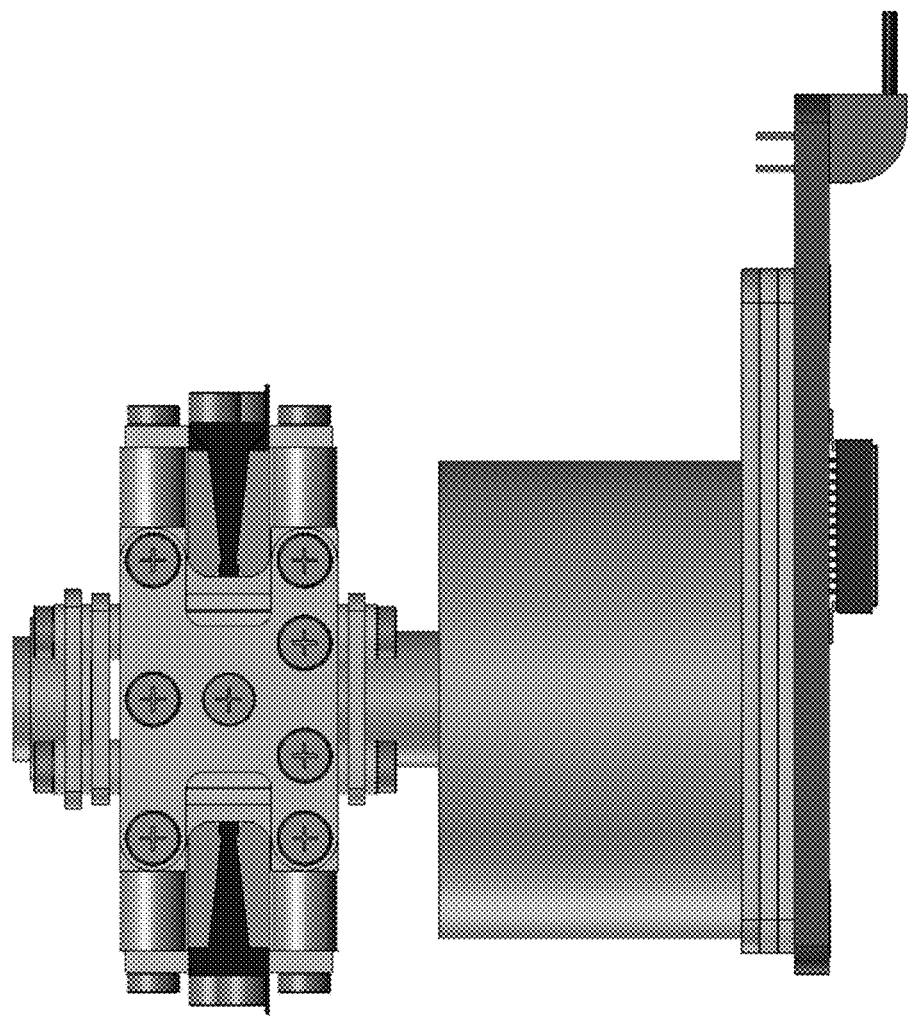
FIG. 12 provides an alternative view of a RAMS instrument and components in accordance with an exemplary embodiment of the invention.

FIG. 3 depicts a RAMS 100 implemented in a 3U cubesat to determine attitude, in accordance with an exemplary embodiment of the invention. In general, the RAMS 100 is an attitude sensor based on sensing the ram direction via a neutral wind measurement and coupling that with a magnetometer 105 measurement to provide continuous attitude knowledge relative to the local orbit frame. Additionally, real-time estimates of the local crosswind direction and neutral density, and the magnetometer biases, scale factors, and internal misalignments are obtained.

More specifically, the ram sensor 200 can measure the ram direction (R) 305 that is composed of the spacecraft velocity direction (V) 310 and the local wind direction (W) 315, represented in FIG. 3. A module, such as a ram sensor module or measurement interface module (not depicted in the Figure), can process the measurements from the ram sensor 200. The ram direction (R) 305 is made up of the angular components α and β represented in FIG. 3. Simultaneously, the three-axis magnetometer 105 can measure the magnetic field, and a module, such as a magnetometer module or measurement interface module (not depicted in the Figure), can process the measurements from the magnetometer 105 and perform calibration of the magnetometer 105. The magnetometer module can provide the magnetic field vector (B) 320 represented in FIG. 3. The magnetic field vector (B) 320 is made up of the vector components $B_x$, $B_y$, and $B_z$ represented in FIG. 3. Finally, a measurement interface module (not depicted in the Figure) can couple, or combine, the measurements from the ram sensor module and the magnetometer module, and in real-time, provide three-axis attitude knowledge. The three-axis attitude knowledge, which can be sub-degree, of the satellite is relative to the local-vertical, local-horizontal orbit frame regardless of roll angle or sunlight conditions as long as the ram direction is within the field of regard of the entrance aperture.

In summary, the attitude sensor system described herein can be included on small satellites, such as nanosat-class or cubesat-class satellites. The attitude sensor system can include a ram sensor configured to measure neutral winds and provide a density of the neutral winds; a magnetometer configured to measure the geomagnetic field; and a measurement interface module configured to combine the measurements from the ram sensor and magnetometer to calculate attitude information, which includes three-axis attitude knowledge of a satellite relative to a local-vertical local-horizontal orbit frame. The measurement interface module can be configured to process the measurements from the magnetometer, calibrate the magnetometer, and provide a magnetic field vector. Furthermore, the measurement interface module is further configured to provide a horizontal wind direction from the measurements from the ram sensor and magnetometer based on a comparison of an angle between a measured ram vector and a measured field vector and an angle between a predicted ram vector and a predicted field vector from a known orbit location of a satellite and a geomagnetic field model. Finally, the measurement interface module is configured to provide the attitude information to a satellite that comprises the attitude sensor system, which can use the information to adjust the attitude of the satellite.

The RAMS instrument 100 can provide a low-cost option for attitude determination and control of a NanoSat class spacecraft, and other types of spacecraft. The technique is unique and has several advantages over traditional attitude sensors. For example, sun sensors suffer from loss of attitude during eclipse conditions and require multiple units for full coverage. Earth sensors are limited to nadir pointing (or small roll maneuvers off nadir), and require two units for pitch and roll determination. Finally, star cameras are very expensive and can occupy up to half of a 1U CubeSat. The RAMS instrument 100 utilizes in-situ measurements of the ram direction and the magnetic field to provide continuous coverage throughout the orbit (even in eclipse), with unlimited off-nadir roll angle pointing.

There are multiple key technical challenges associated with the successful design and development of the RAMS instrument 100. For example, discrimination between the thermospheric wind vector and the satellite attitude can be difficult. An unprocessed RAMS instrument 100 can provide raw measurements of the satellite frame relative to the true ram direction, which includes the addition of the local thermospheric wind vector, rather than the desired satellite yaw angle relative to the orbital velocity vector. The effect of the local horizontal wind vector can result in up to 5 degrees in yaw error if ignored. However, the magnetometer 105 can provide a secondary measurement that can aid in solving for the horizontal wind component by comparing the angle between the measured ram and field vectors and the angle between the predicted ram and field vectors based on the satellite's known orbit location and a geomagnetic field model.

Another technical challenge is the effect of thermospheric density variations on the sensor design. The molecular density of the thermosphere changes both spatially with altitude and temporally with the 11-year solar cycle. Since the RAMS instrument 100 depends on the ionization and capture of molecules on its detector, the density of the airflow is extremely important. Evaluation of the effects of both aperture size (i.e., the spacing necessary to allow a sufficient number of molecules to pass through the thermionic cathode) and integration time (i.e., the time necessary to collect a sufficient number of ions on the detector) on the performance of the sensor must be studied. In an exemplary embodiment of the invention, the goal is to tailor a specific sensor design and processing algorithm to be optimized for a prescribed mission orbital altitude and solar cycle period with minimal sensor size, mass, and power.

Overheating of the cathode during ionization must also be considered in the RAMS design. One of the critical components of the RAMS instrument 100 is the efficiency at which the neutral ambient plasma is converted to ions prior to entering the sensor's drift chamber. The cathode's efficiency is a function of its operating temperature. An evaluation of the operation of the cathode at different power levels and mounting configurations must be studied to optimize the unit for conversion efficiency, thermal stability and power consumption.

Finally, the effect of high radiation levels on sensor performance is another technical challenge. The impact of high radiation energetic particle levels must be evaluated for their effects on sensor performance. The goal is to understand the potential operating environments and develop the necessary concept of operations for the sensor during periods of poor, or no, performance, such as during crossings through the South Atlantic Anomaly and sub-auroral regions.

Portions, or all, of the invention can comprise a computer program that embodies the functions described herein. Furthermore, the modules described herein, such as the ram sensor module, ram sensor electronics module, magnetometer module, and measurement interface module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the figures and associated description in the application text. Therefore, disclosure of a particular set of program code instructions is not considered necessary for an adequate understanding of how to make and use the invention.

It should be understood that the foregoing relates only to illustrative embodiments of the present invention, and that numerous changes may be made therein without departing from the scope and spirit of the invention as defined by the following claims.

The invention claimed is:

1. An attitude sensor system, comprising:
   a ram sensor device configured to measure neutral winds;
   a magnetometer device configured to measure a geomagnetic field; and
   a measurement interface module configured to:
   determine a horizontal wind direction based on measurements from the ram sensor device and magnetometer device,
   determine attitude information based on the horizontal wind direction, and
   provide attitude information to a satellite comprising the attitude sensor system, wherein the satellite is configured to adjust an attitude of the satellite based on the attitude information.

2. The attitude sensor system of claim 1, wherein the ram sensor device is a two-axis ram sensor head.

3. The attitude sensor system of claim 1, further comprising:
   a ram sensor electronics module configured to power and operate the ram sensor device.

4. The attitude sensor system of claim 1, wherein the magnetometer device is a three-axis magnetometer.

5. The attitude sensor system of claim 1, wherein the measurement interface module is further configured to:
   process the measurements from the magnetometer device;
   calibrate the magnetometer device; and
   provide a magnetic field vector.

6. The attitude sensor system of claim 1, further comprising:
   a sensor head configured to receive thermosphere molecules;
   a charged ion filter, coupled to the sensor head, configured to deflect ions in the thermosphere molecules out of the flow field, thereby filtering neutral molecules in the thermosphere molecules;
   a thermionic cathode chamber, coupled to the charged ion filter, configured to ionize the neutral molecules;

a free drift vacuum chamber, coupled to the thermionic cathode chamber, configured to accelerate the ionized molecules generated by the thermionic cathode chamber through a charged grid and onto a focal plane array; and a detector, coupled to the free drift vacuum chamber, configured to register a location and intensity of a flow field for two-axis angle and density determination.

7. The attitude sensor system of claim 1, wherein the measurement interface module is configured to provide continuous attitude knowledge relative to a local orbit frame by combining the measurements from the ram sensor device and magnetometer device.

8. The attitude sensor system of claim 1, wherein the attitude sensor system is further configured to provide a real-time estimate of a local crosswind director, a neutral density, a bias of the magnetometer device, a scale factor, and an internal misalignment.

9. The attitude sensor system of claim 1, wherein the ram sensor device is further configured to:
measure a ram direction comprising a spacecraft velocity direction and a local wind direction.

10. The attitude sensor system of claim 1, wherein the measurement interface module is further configured to:
generate a magnetic field vector based on the geomagnetic field measured by the magnetometer device.

11. The attitude sensor system of claim 1, wherein the ram sensor device and the measurement interface module are configured based on a predetermined mission orbital altitude and solar cycle period.

12. An attitude sensor system, comprising:
a ram sensor device configured to measure neutral winds;
a magnetometer device configured to measure a geomagnetic field; and
a measurement interface module configured to:
combine measurements from the ram sensor device and magnetometer device to calculate attitude information,
provide a horizontal wind direction from the measurements from the ram sensor device and magnetometer device based on a comparison of an angle between a measured ram vector and a measured field vector and an angle between a predicted ram vector and a predicted field vector from a known orbit location of a satellite and a geomagnetic field model, and
provide attitude information to the satellite, wherein the satellite is configured to adjust an attitude of the satellite based on the attitude information.

13. The attitude sensor system of claim 1, wherein the attitude information comprises three-axis attitude knowledge of the satellite relative to a local-vertical local-horizontal orbit frame.

14. The attitude sensor system of claim 1, wherein the measurement interface module is configured to provide the attitude information to the satellite that comprises the attitude sensor system.

15. The attitude sensor system of claim 1, wherein the ram sensor device is configured to provide a density of the neutral winds.

16. A method for determining attitude, the method comprising:
measuring neutral winds with a ram sensor device;
measuring a geomagnetic field with a magnetometer device;
determining a horizontal wind direction measurements from the ram sensor device and magnetometer device;
determining attitude information based on the horizontal wind direction; and
providing attitude information to a satellite, wherein the satellite adjusts an attitude of the satellite based on the attitude information.

17. The method of claim 16, further comprising:
providing a density of the neutral winds with the ram sensor device.

18. The method of claim 16, wherein the attitude information comprises three-axis attitude knowledge of the satellite relative to a local-vertical local-horizontal orbit frame.

* * * * *